(12) United States Patent
Parsons et al.

(10) Patent No.: US 10,787,253 B2
(45) Date of Patent: *Sep. 29, 2020

(54) VARIABLE DIRECTIONAL THRUST FOR HELICOPTER TAIL ANTI-TORQUE SYSTEM

(71) Applicant: Bell Helicopter Textron Inc., Fort Worth, TX (US)

(72) Inventors: Thomas Dewey Parsons, Fort Worth, TX (US); Carlos Alexander Fenny, Fort Worth, TX (US); Erik John Oltheten, Fort Worth, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/183,035

(22) Filed: Nov. 7, 2018

(65) Prior Publication Data

US 2019/0071173 A1 Mar. 7, 2019

Related U.S. Application Data

(63) Continuation of application No. 15/172,811, filed on Jun. 3, 2016, now Pat. No. 10,377,479.

(51) Int. Cl.
*B64C 27/82* (2006.01)

(52) U.S. Cl.
CPC ...... *B64C 27/82* (2013.01); *B64C 2027/8209* (2013.01); *B64C 2027/8227* (2013.01); *B64C 2027/8236* (2013.01)

(58) Field of Classification Search
CPC .... B64C 2027/8209; B64C 2027/8227; B64C 2027/8254; B64C 2027/8263
See application file for complete search history.

(56) References Cited

U.S. PATENT DOCUMENTS 2,378,617 A * 6/1945 Burke ............... B64C 27/82
416/121
2,491,549 A 12/1949 Brewster, III
(Continued)

FOREIGN PATENT DOCUMENTS

CN 1126157 A 7/1996
CN 201932359 U 8/2011
(Continued)

OTHER PUBLICATIONS

Intellectual Property India, First Examination Report for India Patent Appl. No. 201724019356 dated Jun. 13, 2019, 5 pp.
(Continued)

*Primary Examiner* — Richard G Davis
(74) *Attorney, Agent, or Firm* — Daniel J. Chalker; Edwin S. Flores; Chalker Flores, LLP

(57) ABSTRACT

The present invention includes an anti-torque assembly for a helicopter comprising a plurality of fixed blade pitch motors mounted on one or more pivots on the tail boom of the helicopter, wherein the plurality of fixed blade pitch motors on the one or more pivots are adapted to be oriented substantially in-plane with a tail boom of a helicopter during a first mode of operation that comprises a hover mode and wherein the fixed blade pitch motors are adapted to be oriented substantially off-plane from the tail boom of the helicopter during a second mode of helicopter operation that is different from the first mode.

26 Claims, 5 Drawing Sheets

(56) References Cited

U.S. PATENT DOCUMENTS

| | | | |
|---|---|---|---|
| 4,953,811 A | 9/1990 | Smith | |
| 8,464,980 B2 | 6/2013 | Certain | |
| 8,757,542 B2 | 6/2014 | Hopdjanian et al. | |
| 8,807,476 B2 | 8/2014 | Raffel et al. | |
| 8,870,114 B2 | 10/2014 | Botti et al. | |
| 8,931,732 B2 | 1/2015 | Sirohi et al. | |
| 8,944,367 B2 | 2/2015 | Bystry, Jr. et al. | |
| 8,979,015 B2 | 3/2015 | Gaillard | |
| 9,004,395 B2 | 4/2015 | Botti et al. | |
| 9,067,676 B1 | 6/2015 | Hethcock et al. | |
| 9,085,355 B2 | 7/2015 | DeLorean | |
| 9,169,027 B2 | 10/2015 | Strauss et al. | |
| 9,174,728 B2 | 11/2015 | Altmijus et al. | |
| 9,181,811 B2 | 11/2015 | Germanetti | |
| 9,194,285 B2 * | 11/2015 | Botti | B64D 27/24 |
| 9,242,728 B2 | 1/2016 | Morrison | |
| 9,248,908 B1 | 2/2016 | Luyks | |
| 9,446,842 B2 | 9/2016 | Luyks | |
| 9,592,899 B2 | 3/2017 | Fink | |
| 9,631,516 B2 | 4/2017 | Hamann et al. | |
| 9,758,245 B2 | 9/2017 | Ries | |
| 9,764,822 B2 | 9/2017 | Morrison | |
| 2004/0217229 A1 | 11/2004 | Arlton | |
| 2010/0127114 A1 | 5/2010 | Nakayama et al. | |
| 2011/0121128 A1 | 5/2011 | Balkus, Jr. | |
| 2012/0012693 A1 * | 1/2012 | Thomassey | B64C 27/82 244/17.21 |
| 2012/0160954 A1 * | 6/2012 | Thomassey | B64C 27/82 244/17.13 |
| 2013/0092789 A1 | 4/2013 | Botti et al. | |
| 2013/0134256 A1 | 5/2013 | Gaillard | |
| 2013/0147204 A1 | 6/2013 | Botti et al. | |
| 2013/0170985 A1 | 7/2013 | Altmikus et al. | |
| 2013/0264412 A1 * | 10/2013 | Dyrla | B64C 27/82 244/17.13 |
| 2014/0158816 A1 | 6/2014 | DeLorean | |
| 2014/0290208 A1 | 10/2014 | Rechain et al. | |
| 2015/0225078 A1 | 8/2015 | Ries | |
| 2016/0052626 A1 | 2/2016 | Vander Mey | |
| 2016/0083085 A1 | 3/2016 | Strauss et al. | |
| 2016/0272296 A1 * | 9/2016 | Fink | B64C 1/063 |
| 2016/0311528 A1 | 10/2016 | Nemovi et al. | |
| 2017/0066531 A1 | 3/2017 | McAdoo | |
| 2017/0174335 A1 | 6/2017 | Malloy | |
| 2017/0174355 A1 | 6/2017 | Waltner et al. | |
| 2017/0253326 A1 | 9/2017 | Mullins | |
| 2017/0253328 A1 | 9/2017 | Wang | |
| 2017/0349273 A1 | 12/2017 | Parsons et al. | |
| 2017/0349274 A1 | 12/2017 | Fenny et al. | |
| 2017/0349276 A1 | 12/2017 | Fenny et al. | |

FOREIGN PATENT DOCUMENTS

| | | |
|---|---|---|
| CN | 102971216 A | 3/2013 |
| CN | 103661917 | 3/2014 |
| DE | 202012001750 U1 | 3/2012 |
| DE | 102011054849 B3 | 1/2013 |
| EP | 1976755 | 10/2008 |
| EP | 2155552 | 2/2010 |
| EP | 2186727 A2 | 5/2010 |
| EP | 2327625 A1 | 6/2011 |
| EP | 2394914 A1 | 12/2011 |
| EP | 2404775 A2 | 1/2012 |
| EP | 2412630 A1 | 2/2012 |
| EP | 2571761 A0 | 3/2013 |
| EP | 2571763 | 3/2013 |
| EP | 2571764 | 3/2013 |
| EP | 2610176 | 7/2013 |
| EP | 2631174 A1 | 8/2013 |
| EP | 2636601 A1 | 9/2013 |
| EP | 2739530 | 6/2014 |
| EP | 2821344 A1 | 1/2015 |
| EP | 2933187 A1 | 10/2015 |
| EP | 2982604 A1 | 2/2016 |
| EP | 3116781 | 9/2016 |
| EP | 3137376 | 3/2017 |
| EP | 3216696 A1 | 9/2017 |
| EP | 3251952 A1 | 12/2017 |
| EP | 3254962 A1 | 12/2017 |
| EP | 3254963 A1 | 12/2017 |
| FR | 2951137 A1 | 4/2011 |
| JP | 2003175897 | 6/2003 |
| JP | 2009090755 | 4/2009 |
| JP | 2009090755 A | 4/2009 |
| KR | 1020150070951 A | 6/2015 |
| WO | 2016/128330 A1 | 8/2016 |
| WO | 2016/164280 A1 | 10/2016 |

OTHER PUBLICATIONS

Intellectual Property India, First Examination Report for India Patent Appl. No. 201724019354 dated Jul. 18 2019, 7 pp.
Intellectual Property India, First Examination Report for India Patent Appl. No. 201724019355 dated Jul. 18 2019, 6 pp.
Canadian Intellectual Property Office, Examination Report for CA Appl. No. 2,969,660 dated Sep. 14, 2018, 4 pp.
European Patent Office, Communication Pursuant to Article 94(3) EPC for EP Appl. No. 17174337.0 dated Dec. 1, 2017, 4 pp.
European Patent Office, Communication Pursuant to Article 94(3) EPC for EP Appl. No. 17172943 dated Dec. 1, 2017, 5 pp.
European Patent Office, Communication Pursuant to Article 94(3) EPC for EP Appl. No. 17174263.8 dated Nov. 10, 2017, 8 pp.
European Patent Office, Extended European Search Report for EP Application Serial No. 17174263.8, dated Oct. 17, 2017, 4 pp.
European Patent Office, Extended European Search Report for EP Application Serial No. 17174337.0, dated Nov. 15, 2017, 5 pp.
European Patent Office, Extended European Search Report for EP Application Serial No. 17174294.3, dated Nov. 14, 2017, 4 pp.
China National Intellectual Property Administration, Examination Report dated Jul. 29, 2019 for Chinese Appl. No. 201710408558.7, 15 pp.
China National Intellectual Property Administration, Examination Report dated Aug. 12, 2019 for Chinese Appl. No. 201710409135.7, 14 pp.
China National Intellectual Property Administration, Examination Report dated Aug. 15, 2019 for Chinese Appl. No. 201710408541.1, 19 pp.
European Patent Office, Extended European Search Report for EP Application Serial No. 18211495.9, dated Feb. 27, 2019, 4 pp.
European Patent Office, Communication pursuant to Article 94(3) EPC for EP Application Serial No. 18211495.9, dated Mar. 14, 2019, 4 pp.

* cited by examiner

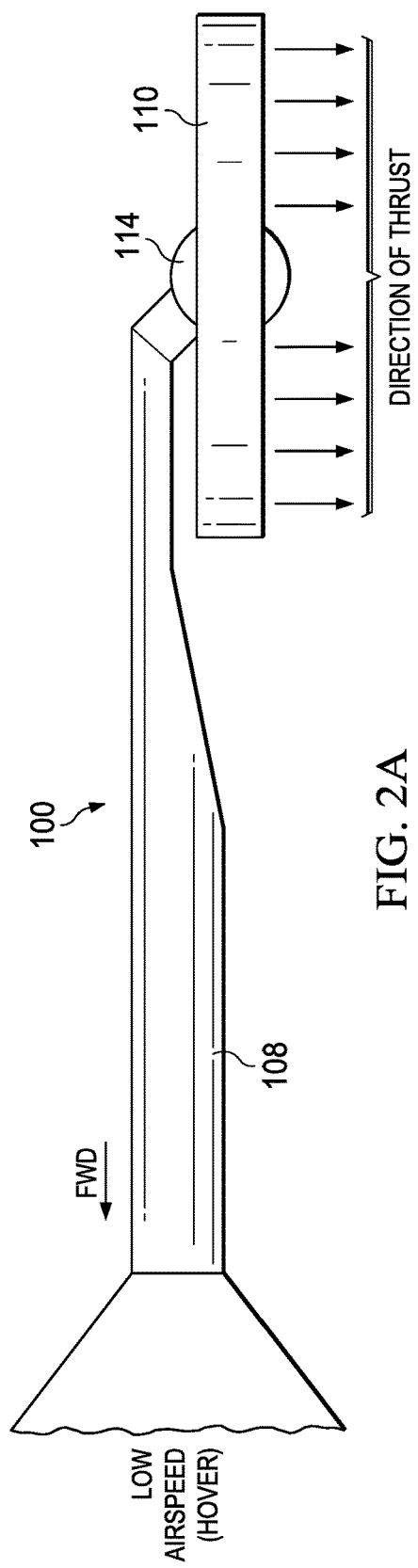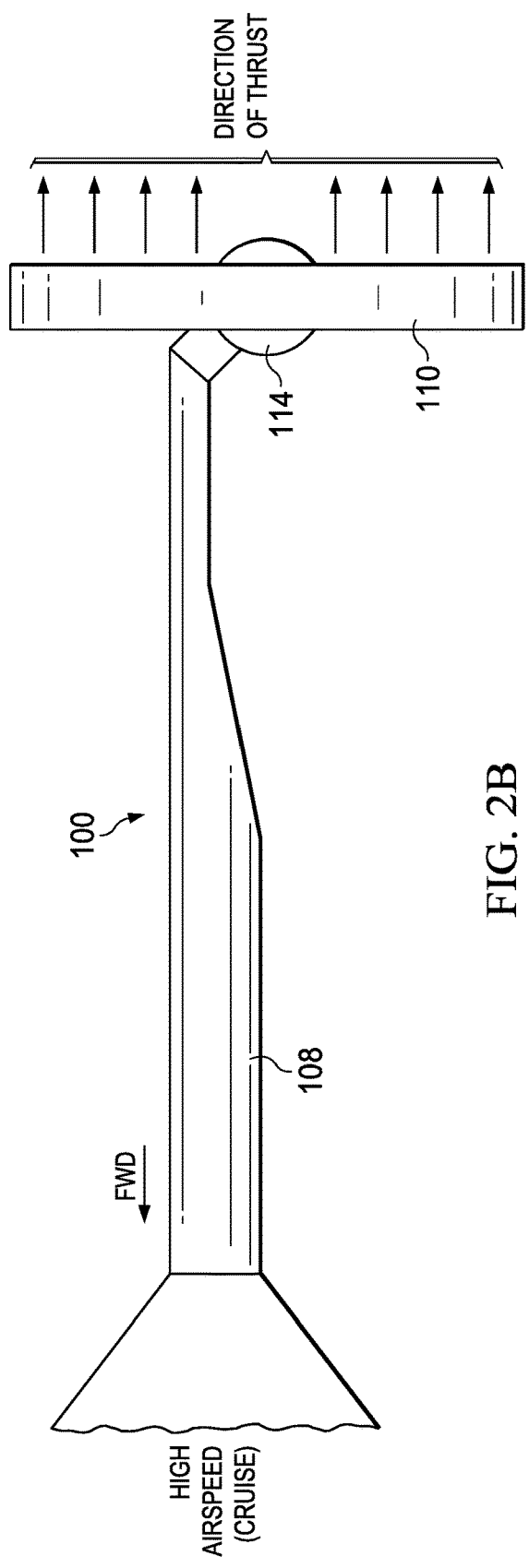
FIG. 2A
FIG. 2B

VARIABLE DIRECTIONAL THRUST FOR HELICOPTER TAIL ANTI-TORQUE SYSTEM

CROSS-REFERENCE TO RELATED APPLICATIONS

This application is a continuation of U.S. patent application Ser. No. 15/172,811 filed on Jun. 3, 2016, now U.S. Pat. No. 10,377,479. The entire contents of which is hereby incorporated by reference for all purposes.

TECHNICAL FIELD OF THE INVENTION

This invention is generally in the field of flight control, and relates specifically to an anti-torque system and control for helicopters.

STATEMENT OF FEDERALLY FUNDED RESEARCH

Not applicable.

BACKGROUND OF THE INVENTION

Without limiting the scope of the invention, its background is described in connection with anti-torque systems.

Counter-torque tail rotors are often used in helicopters and are generally mounted adjacent to vertical fins that provide for aircraft stability. In such a configuration, the helicopter rotor produces a transverse airflow. Tail rotors can be driven at high angular velocities to provide adequate aerodynamic responses. Sometimes, vortices produced by a main helicopter rotor and the tail rotor can interact to reduce the efficiency of the thrust created by the rotors. The interference of the vortices may also cause an increase in noise.

To address these issues, the vertical fin can be replaced by an annular airfoil (sometimes called a ring wing) having an inner diameter greater than the diameter of the tail rotor and which can be mounted around the tail rotor.

SUMMARY OF THE INVENTION

In one embodiment, the present invention includes an anti-torque assembly for a helicopter comprising: a plurality of fixed blade pitch motors mounted on one or more pivots on the tail boom of the helicopter, wherein the plurality of fixed blade pitch motors on the one or more pivots are adapted to be oriented substantially in-plane with a tail boom of a helicopter during a first mode of operation that comprises a hover mode and wherein the fixed blade pitch motors are adapted to be oriented substantially off-plane from the tail boom of the helicopter during a second mode of helicopter operation that is different from the first mode. In one aspect, the plurality of fixed blade pitch motors can operate: in a different direction from the other motors to provide opposing thrust; with the thrust in the same direction; with different speeds; or with different directions and speeds. In another aspect, the anti-torque assembly comprises 3, 4, 5, 6, 7, 8, 9, 10, 11, 12, 13, 14, 15, or more fixed blade pitch motors, and each motor can be: turned on or off independently or as a group; is a variable speed motor; or each motor can independently direct thrust in a different direction. In another aspect, the anti-torque assembly is defined as further comprising a ring or cowling that surrounds one or more individual motors of the anti-torque assembly that each ring or cowling being attached to a separate pivot, or the anti-torque assembly is surrounded by a single ring or cowling that is attached to the pivot. In another aspect, the anti-torque assembly is substantially co-planar with the tail boom during the hover mode. In another aspect, the second mode of helicopter operation is a flight mode, and wherein the anti-torque assembly is substantially perpendicular with the tail boom during the flight mode. In another aspect, the motors are electric. In another aspect, the module further comprises a logic in a flight control computer for calculating the anti-torque assembly system during transition to and from the first to the second mode of operation and for independently controlling fan direction and speeds for the fixed blade pitch motors to position the anti-torque assembly system for optimum thrust angle, as well as optimum thrust magnitude.

Another embodiment of the present invention includes an anti-torque assembly system for a helicopter, the system comprising: a plurality of fixed blade pitch electrically-driven, variable-speed motors mounted on one or more pivots; and one or more drive mechanisms to orient the fixed blade pitch electrically-driven, variable-speed motors to be substantially in-plane with a tail boom of a helicopter during a first mode of helicopter operation that comprises a hover mode and that orients the fixed blade pitch electrically-driven, variable-speed motors substantially off-plane with the tail boom of the helicopter during a second mode of helicopter operation that is different from the first mode, wherein the second mode of helicopter operation is a flight mode. In one aspect, the system further comprises a logic in a flight control computer for calculating the direction and thrust from the anti-torque assembly system during transition to and from the first to the second mode of operation and for independently controlling fan direction and speeds of the fixed blade pitch electrically-driven, variable-speed motors, and to position the anti-torque assembly system for optimum thrust angle, as well as optimum thrust magnitude.

In yet another embodiment, the present invention includes a method of operating a helicopter, the method comprising: orienting an anti-torque assembly comprising two or more fixed blade pitch electrically-driven, variable-speed motors on a pivot at the end of a tail boom of the helicopter, wherein the fixed blade pitch electrically-driven, variable-speed motors are substantially in-plane with the tail boom of the helicopter during a first mode of helicopter operation that comprises a hover mode and wherein the two or more fixed blade pitch electrically-driven, variable-speed motors are substantially off-plane with the tail boom of the helicopter during a second mode of helicopter operation that is different from the first mode, wherein the second mode of helicopter operation is a flight mode.

BRIEF DESCRIPTION OF THE DRAWINGS

For a more complete understanding of the features and advantages of the present invention, reference is now made to the detailed description of the invention along with the accompanying figures and in which:

FIGS. 2A and 2B show schematic diagrams of a helicopter showing in FIG. 2A the position and overall thrust of the anti-torque assembly during hover mode with the direction of thrust to oppose the rotational motion of the main rotor during, e.g., hover. FIG. 2B also shows a top-view of the anti-torque assembly, but the anti-torque assembly is rotated about an axis with the direction of thrust shown toward the rear of the helicopter, in this case adding to the forward thrust which is generally used during high airspeed cruise.

DETAILED DESCRIPTION OF THE INVENTION

Figure 1:
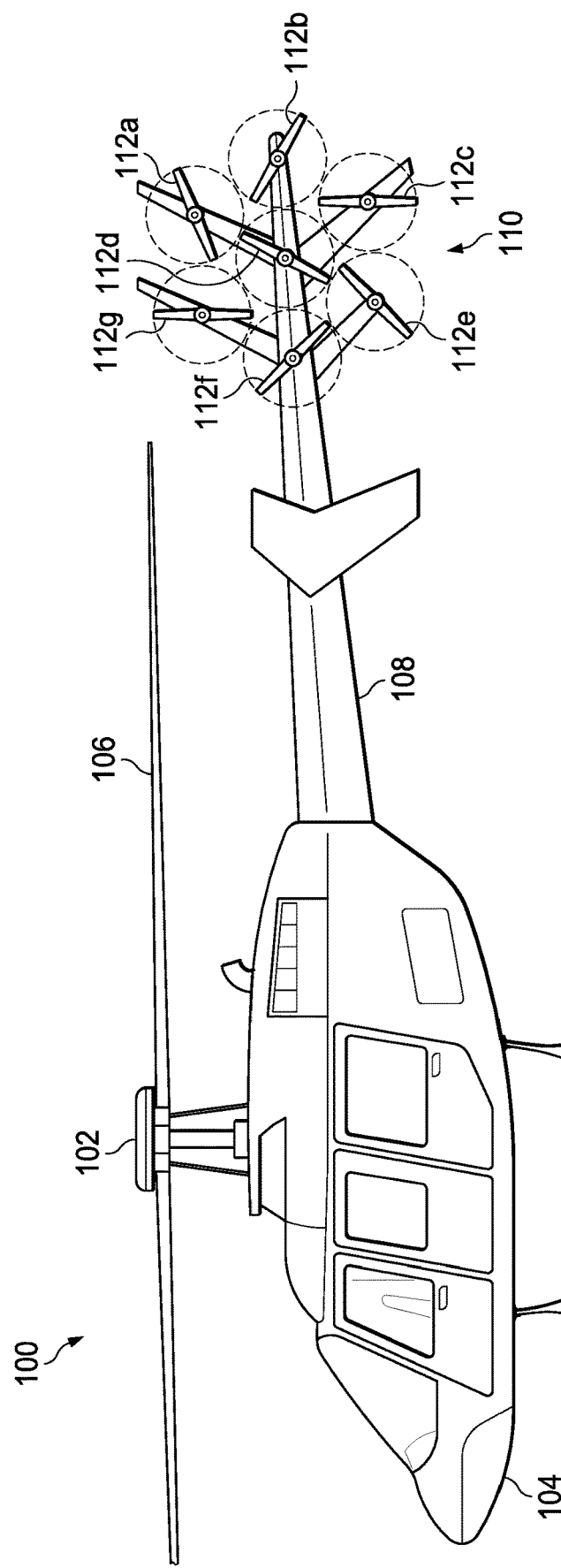
FIG. 1 is a side-view schematic diagram of a helicopter showing an anti-torque assembly shown with fixed blade pitch motors.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Most helicopters with a single, main rotor system require a separate rotor to overcome torque. This is traditionally accomplished on helicopters using a variable pitch, anti-torque rotor or tail rotor receiving power from the engine(s) through shafts and gearboxes. The present inventors have previously disclosed an anti torque control using a matrix of fixed blade pitch motor modules that uses a matrix of small fixed blade pitch electric motor modules in place of a traditional tail rotor.

With this configuration in mind (multiple electrically-driven, variable-speed motors driving fans), the anti-torque assembly of the present invention can be hinged at its center and free to rotate about an axis, e.g., a vertical or a horizontal axis. Logic contained in the flight control computer could independently control individual fan speeds to position the assembly for optimum thrust angle, as well as optimum thrust magnitude. This ability to modulate the direction and magnitude of tail rotor thrust can allow optimization of overall aircraft performance.

The present invention has certain advantages over prior tail-rotor configurations. One such advantage is the low rotational inertia of the individual fixed blade pitch motors (e.g., electrically, hydraulically, or pneumatically driven motors) that together form the anti-torque assembly, wherein the individual motors can be individually controlled to have their speed and direction changed rapidly. The present invention also eliminates the complexity of a variable blade pitch system. Another advantage of the present invention is that the use of a large number of fixed blade pitch electrically-driven, variable-speed motors provides safety and reliability from component failures through a high level of redundancy without excessive weight. Further, the wide distribution of fixed blade pitch electrically-driven, variable-speed motors provides for increased safety from external threats such as collision and lightening.

The present invention has further advantages. For example, when on the ground and with main rotor turning, the lower inertia of the fixed blade pitch electrically-driven, variable-speed motors allows for their motion to stop, which is further supported by the ability to shut down the motors which reduces the injury risk from blade contact to personnel. Further, as shown in one embodiment herein, the present invention allows for increased cruise efficiency through directional optimization of thrust angle of the anti-torque assembly. Additional advantages of the present invention include reduced passenger noise and vibration by operating only a subset of the plurality of fixed blade pitch electrically-driven, variable-speed motors at optimum speeds and directions and from the distributed noise profile they produce. Yet another advantage provided by the fixed blade pitch electrically-driven, variable-speed motors is a reduction in objectionable ground noise in hover by operating the motors at optimum speeds and directions.

The fixed blade pitch electrically-driven, variable-speed motors of the present invention provide integration of yaw stability augmentation capability through Fly-by-Wire control. Finally, the speed of the fixed blade pitch electrically-driven, variable-speed motors can be increased when operating at higher altitudes to compensate for decrease in thrust.

The present invention includes a convertible helicopter anti-torque assembly that uses fixed blade pitch electrically-driven, variable-speed motors for ground and low speed forward flight. The anti-torque assembly can have a surrounding ring or cowling that acts in place of a traditional tail rotor of a helicopter and that is connected to the helicopter via a pivot that can be used to direct the thrust of one or more motors of the anti-torque assembly. Alternatively, individual fixed blade pitch electrically-driven, variable-speed motors can each have a surrounding ring or cowling that is connected to a pivot. The combined blades of the various tail rotor motors that form the module can each provide separate thrust. The anti-torque assembly fixed can include two, three, four, five, six, seven, eight, nine, ten or more individual fixed blade pitch variable-speed motors, which can operate alone or in one or more combinations and in one or more directions.

When provided within a cowling, the various vortices can be captured to form a circulating air pattern, which can act as a pump to draw additional air through the center of the fixed blade pitch electrically-driven, variable-speed motors from the region adjacent the upstream surface of motors. The circulating air pattern and eduction can increase the diameter of the wake and the volume of air transported by the anti-torque assembly. The wake of the anti-torque assembly can be transported at a slow rate while including a greater mass of air by the operation of the combined fixed blade pitch electrically-driven, variable-speed motors, thus resulting in increased efficiency in the operation of the overall anti-torque assembly that acts as a tail rotor.

By using smaller individual electric motors, each having their own fixed pitch propeller, the overall rotational energy of each propeller is much smaller and can even use softer or even frangible materials that will protect any ground crews when coming into contact during a hover or slow flight, while still providing the additive aerodynamic forces to control aircraft yaw, roll or pitch in forward flight.

The fixed blade pitch electrically-driven, variable-speed motors can provide longitudinal pitch trim and lateral yaw trim. In cruise mode, the flow axis of the fixed blade pitch electrically-driven, variable-speed motors is aligned generally with or along the long axis of the fuselage to serve as a horizontal stabilizer. In hover mode, the arrangement of the fixed blade pitch electrically-driven, variable-speed motors eliminates the down load of a horizontal tail surface that may arise due to interference with the down wash from the main rotor. The fixed blade pitch electrically-driven, variable-speed motors can also off-load the anti-torque assembly in forward flight by positioning itself with a yaw-direction incidence angle via a pilot trim control, thereby reducing power consumption. The anti-torque assembly presents a surface area in sideward flight, and can thereby serve in a passive roll as a yaw damper. The anti-torque assembly can also help reduce the size of a horizontal stabilizer. Alternatively or in addition, application of the anti-torque assembly can allow for the elimination of both vertical and horizontal surfaces normally utilized on conventional helicopters. This can allow a reduction in weight, download for a horizontal stabilizer in the rotor wake and reduced projected side area and drag in lateral (side) flight.

The invention takes advantage of the unique performance capabilities of electric motors for use in helicopter anti torque control. Using this distributed electric propulsion design and today's flight control technology, each motor can be controlled independently to vary individual motor thrust, and thereby position the anti-torque assembly (hinged at the center and free to rotate about the vertical axis) for optimum overall thrust (direction and magnitude). In hover mode, a helicopter requires anti-torque thrust perpendicular to the airframe's centerline. As the helicopter increases its forward airspeed, this perpendicular thrust requirement reduces. As the anti-torque thrust requirement reduces, this thrust can now be directed more aft to optimize power utilization and overall aircraft performance. At maximum airspeed, this thrust could be directly almost entirely aft.

FIG. 1 is a side-view schematic diagram of a helicopter 100 having the anti-torque assembly 110, depicted in this version with seven fixed blade pitch motors 112a-g, which can be fixed blade pitch electrically-driven and/or variable-speed motors. The helicopter 100 includes a rotary system 102 carried by a fuselage 104. Rotor blades 106 connected to the rotary system 102 provide flight for the helicopter 100. The rotor blades 106 are controlled by multiple controllers within the fuselage 104. For example, during flight, a pilot can manipulate cyclic controllers (not shown) for changing a pitch angle of the rotor blades 106 and/or manipulate pedals (not shown) to provide vertical, horizontal and yaw flight control. The helicopter 100 has a tail boom 108, which supports the anti-torque assembly 110 at the aft end. The fixed blade pitch motors 112a-g provide counter-torque force for transversely stabilizing the helicopter 100. Each of the fixed blade pitch motors 112a-g is mounted as part of the anti-torque assembly 110 on the tail boom 108. The anti-torque assembly 110 is centered on a hub such that a leading edge of the anti-torque assembly 110 is presented to the side of the helicopter 100 toward the tail boom 108. For example, when a single main rotor the helicopter 100 is rotating counter-clockwise when viewed from above, the leading edge of anti-torque assembly 110 is to the right (starboard) side of the helicopter 100.

In FIG. 2A a top-view schematic diagram of a helicopter 100 shows the anti-torque assembly 110 on the tail boom 108 during hover mode with the direction of thrust to oppose the rotational motion of the main rotor during, e.g., hover.

FIG. 2B shows a top-view of a helicopter 100 but the anti-torque assembly 110 on the tail boom 108 has been rotated about a single pivot or axis 114 with the direction of thrust shown toward the rear of the helicopter 100, in this case adding to the forward thrust which is generally used during high airspeed cruise. In this embodiment, the pivot 114 is shown offset from the longitudinal axis of the tail boom 108, however, the pivot 114 and the anti-torque assembly 110 can also be centered along the longitudinal axis of the tail boom 108.

In operation, the anti-torque assembly 110 is oriented substantially in-plane with the tail boom 108 of the helicopter 100 during a first mode of helicopter operation. For example, the first mode of helicopter operation is a hover mode, which is typically a mode in which the helicopter 100 is sitting on or about the ground with the anti-torque assembly 110 provides thrust from the one or more fixed blade pitch motors 112a-g when the helicopter 100 is operating in slow speed flight. In this orientation, the anti-torque assembly 110 can provide maneuverability and trim to the helicopter operation. During hover, the direction of thrust of the one or more fixed blade pitch motors 112a-g of the anti-torque assembly 110 can be in opposing directions, for example, one subset of motors can direct their thrust in one direction, while another subset can be directed in the opposite direction to provide finer rotational control to the helicopter 100. Of course, the speed of the individual motors can also be varied, under control of a logic in a flight control computer that calculates the position of the anti-torque assembly 110 during transition to and from the first to the second mode of operation and for independently controlling individual fan speeds to position the assembly for optimum thrust angle, as well as optimum thrust magnitude.

In a second mode of operation, the anti-torque assembly 110 is oriented substantially off-plane with the tail boom 108 of the helicopter 100 during a second mode of helicopter operations that is different from the first mode. For example, the second mode of helicopter operation is a flight mode (e.g., a low to high speed forward flight mode). In the flight mode, the orientation of the anti-torque assembly 110 is changed from being substantially co-planar with the tail boom 108 to being non-planar. For example, the anti-torque assembly 110 can be substantially perpendicular with the plane of the tail boom 108, by pivoting about pivot 114. Alternatively, the orientation of the anti-torque assembly 110 can be anywhere between co-planar and perpendicular relative to the tail boom 108.

Figure 3A:
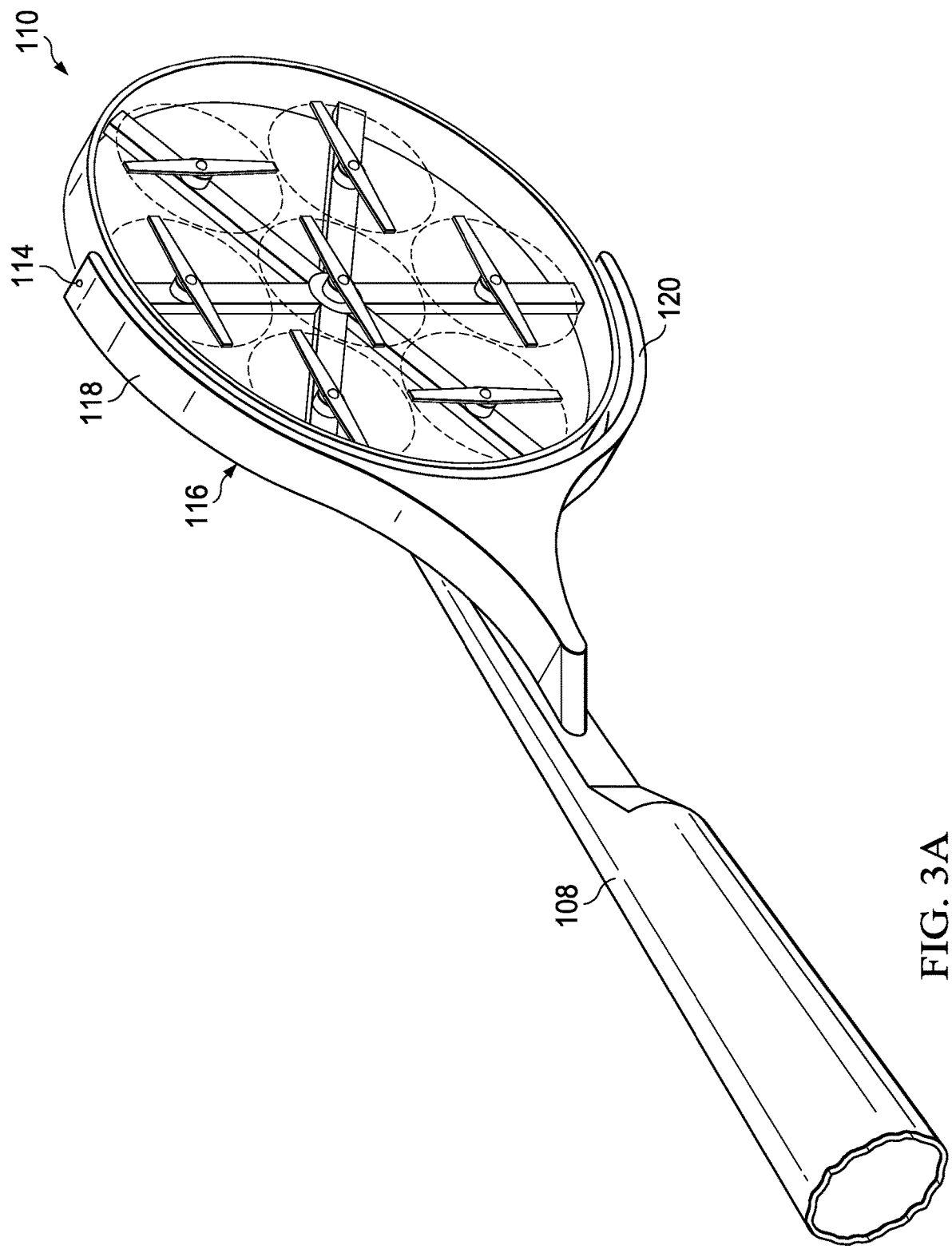
FIG. 3A is an isometric schematic diagram of the tail portion of a helicopter that shows the anti-torque assembly in hover mode.
Figure 3B:
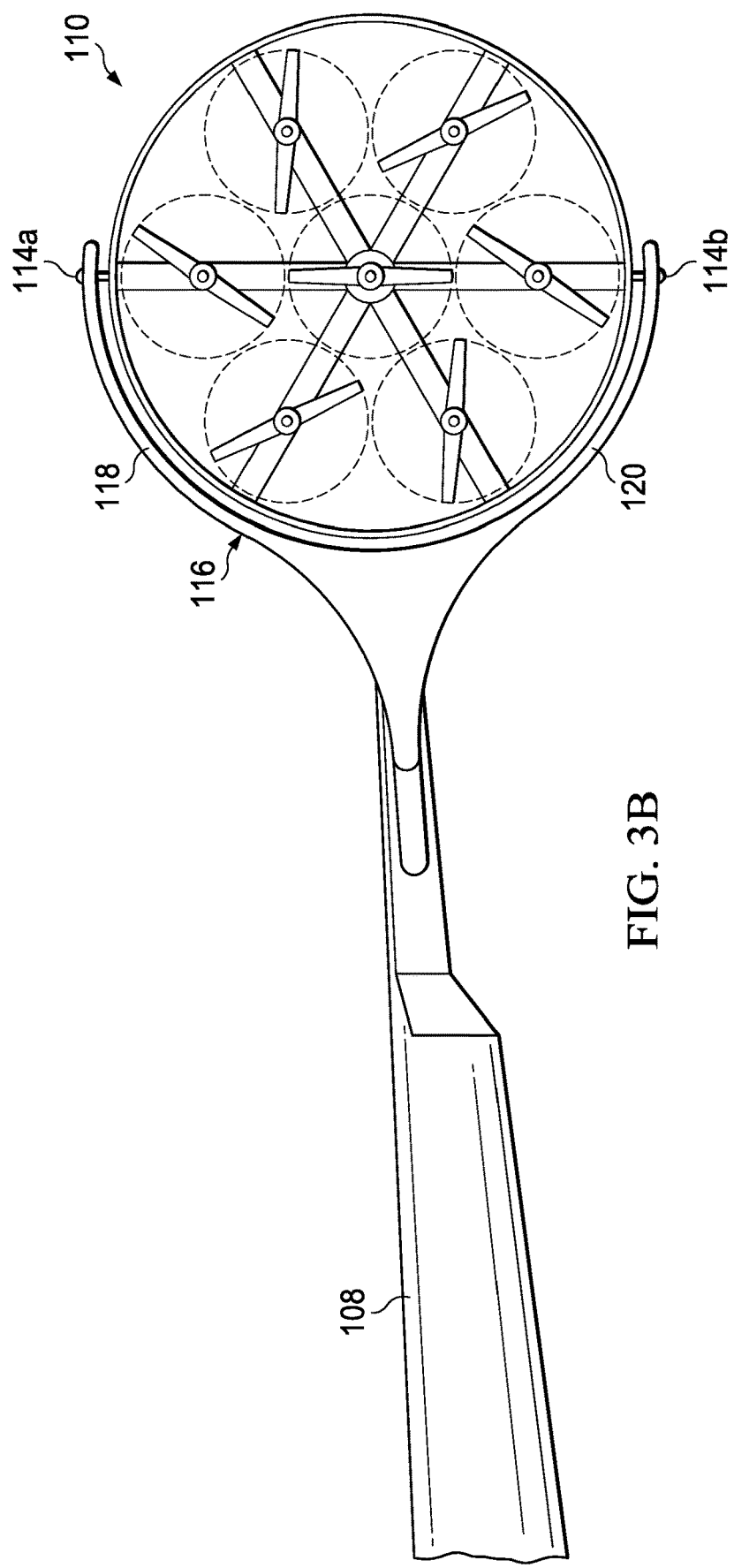
FIG. 3B is a side-view schematic diagram of the tail portion of a helicopter that shows the anti-torque assembly in hover mode.

FIGS. 3A and 3B show a schematic diagram of the anti-torque assembly 110 oriented in-plane with the tail boom 108 of the helicopter 100. The anti-torque assembly 110 is mounted to the tail boom 108 of the helicopter 100 using pivot 114. As shown in FIG. 2, the pivot 114 is offset from the tail boom 108 to allow the anti-torque assembly 110 to be rotated. In some implementations, a distance by which the anti-torque assembly 110 is offset from the tail boom 108 depends on the position of the pivot 114. In this embodiment, the pivot 114 is connected a fork 116 attached to the tail boom 108. The fork 116 includes an upper end 118 and a lower end 120. The anti-torque assembly 110 is mounted to the fork 116 between the upper end 118 and the lower end 120. For example, the anti-torque assembly 110 can include an upper pivot position 114a and a lower pivot position 114b attached to the upper end fork 116 and the lower end 120, respectively.

FIG. 3B is a schematic diagram of an elevation view of the anti-torque assembly 110 oriented in-plane with the tail boom 108 of the helicopter 100 on upper and lower pivots 114a,b. The bottom portion of the fork 116, which includes the lower end 120 can be thicker than the top portion of the fork 116 which includes the upper end 118. When the helicopter 100 flares, e.g., during landing, the anti-torque assembly 110 is at its lowest point creating a risk of contact with the ground. If there is contact, the thicker bottom portion of the lower end 120 can provide greater strength to the fork 116 to take the force of contact and decrease (e.g., minimize or prevent) flexing, thereby protecting the anti-torque assembly 110. In some implementations, a stinger (not depicted) can be connected to the fork 116 as an alternative or in addition to having a thicker bottom portion to take the force of contact and decrease flexing.

Figure 3C:
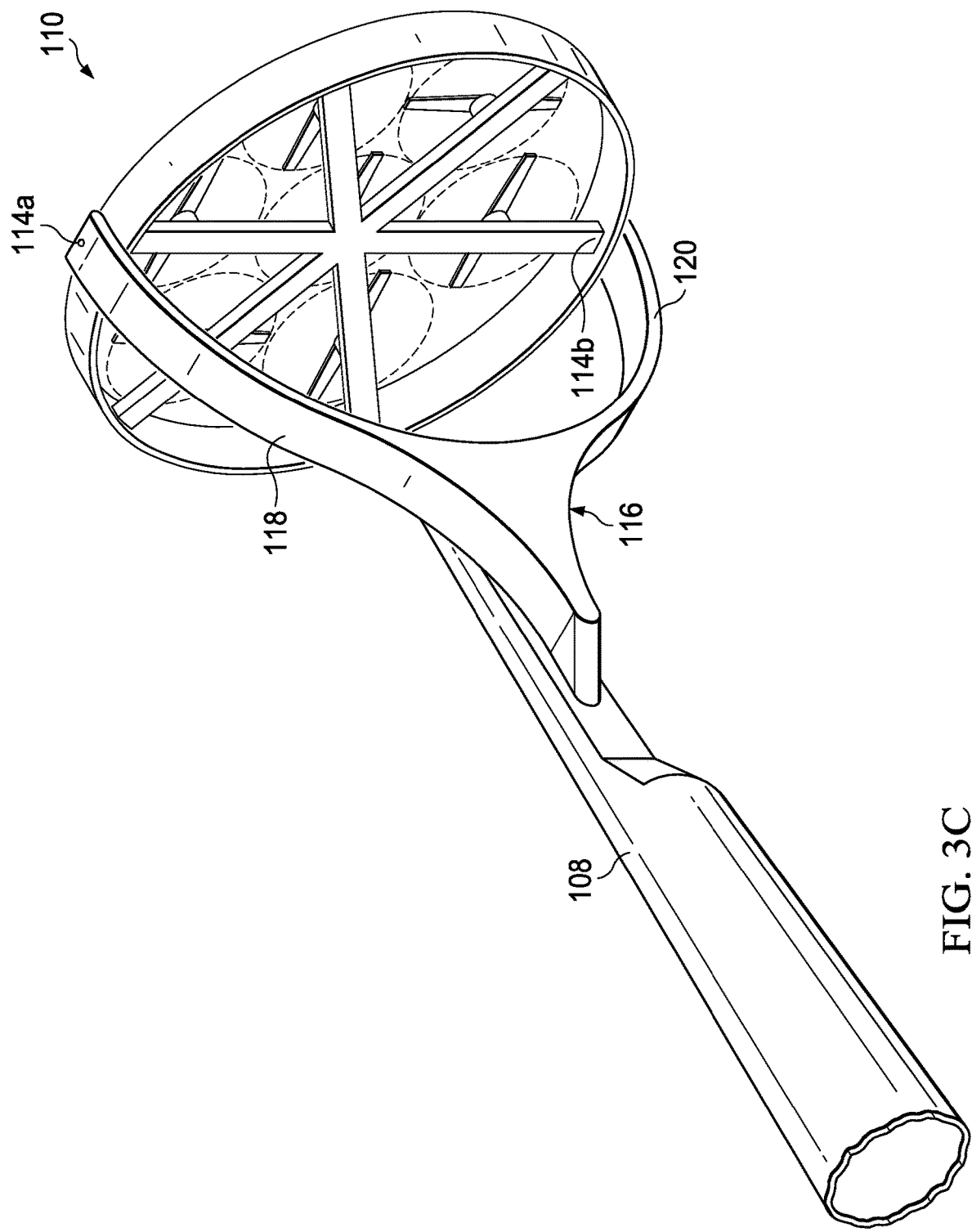
FIG. 3C is an isometric schematic diagram of the tail portion of a helicopter that shows the anti-torque assembly in thrust mode.

FIG. 3C is a schematic diagram of the anti-torque assembly 110 oriented off-plane with the tail boom 108 of the helicopter 100. In FIG. 3C, the anti-torque assembly 110 has been rotated on a Z-axis that passes between the upper end axis 114a and the lower end axis 114b perpendicular from an in-plane orientation during a hover mode to an off-plane rotation during a flight mode in which the anti-torque assembly 110 is substantially perpendicular to a rotational plane of the tail boom 108. In some implementations, the anti-torque assembly 110 can be pivoted on a horizontal X-axis to provide yaw control of the helicopter 100.

A pivoting mechanism and the anti-torque assembly 110 can be included at the end of the tail boom 108 of the helicopter 100. In some implementations, the pivoting mechanism can be electric, or can even be a bell crank system and can include a pulley cable system connected to the bell crank system. The pivoting mechanism can be controlled by an operator of the helicopter 100 to orient the anti-torque assembly 110 substantially in-plane with the tail boom 108 of the helicopter 100 during a first mode of helicopter operation, and to orient the anti-torque assembly 110 substantially off-plane with the tail boom 108 of the helicopter 100 during a second mode of helicopter operation that is different from the first mode. In a fly-by-wire configuration, the pivoting mechanism can be controlled by a logic in a flight control computer that calculates the position of the anti-torque assembly 110 during transition to and from the first to the second mode of operation and for independently controlling individual fan speeds to position the assembly for optimum thrust angle, as well as optimum thrust magnitude.

A number of implementations have been described. Nevertheless, it will be understood that various modifications may be made without departing from the spirit and scope of the disclosure. In some implementations, the fixed blade pitch electric motor module can be controlled by pilot inputs in combination with the operating status of the air vehicle (e.g., hover, transition or forward flight). In implementations in which the rotorcraft is operated using some form of fly-by-wire or fly-by-light control systems, the fixed blade pitch electric motor module operation can be controlled by the computer system, which, in turn, can get cues from the pilot's inputs, etc.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. An anti-torque assembly for a helicopter having a tail boom and one or more pivots on the tail boom, the anti-torque assembly comprising:
a plurality of electrically driven, variable-speed motors mounted on the one or more pivots on the tail boom of the helicopter, wherein each electrically driven, variable-speed motor drives a fixed blade pitch rotor and the plurality of electrically driven, variable-speed motors on the one or more pivots are adapted to be oriented to direct a thrust anywhere between cancelling a torque of a rotor blade and towards a rear of the helicopter; and
wherein each electrically driven, variable-speed motor is independently controlled.

2. The assembly of claim 1, wherein the plurality of electrically driven, variable-speed motors can operate: in a different direction from the other motors to provide opposing thrust; with the thrust in the same direction; with different speeds; or with different directions and speeds.

3. The assembly of claim 1, wherein the plurality of electrically driven, variable-speed motors comprise 3, 4, 5, 6, 7, 8, 9, 10, 11, 12, 13, 14, 15, or more electrically driven, variable-speed motors, and each motor can be: turned on or off independently or as a group; or each motor can independently direct thrust in a different direction.

4. The assembly of claim 1, wherein the thrust adjusts at least one of a yaw, roll or pitch of the helicopter.

5. The assembly of claim 1, further comprising a ring or cowling that surrounds one or more of the individual electrically driven, variable-speed motors and rotors of the anti-torque assembly, each ring or cowling being attached to a separate pivot, or the anti-torque assembly is surrounded by a single ring or cowling that is attached to the pivot.

6. The assembly of claim 1, further comprising a logic in a flight control computer that calculates a direction and the thrust from the anti-torque assembly.

7. The assembly of claim 6, wherein the logic in the flight control computer independently controls fan direction and speeds for the electrically driven, variable-speed motors to position the anti-torque assembly for optimum thrust angle, as well as optimum thrust magnitude.

8. The assembly of claim 1, wherein the pivot is offset from the tail boom.

9. The assembly of claim 1, further comprising a fork attached to the tail boom, wherein the anti-torque assembly is mounted to the fork.

10. The assembly of claim 9, wherein the fork includes an upper end and a lower end attached to an upper pivot position and a lower pivot position, respectively, of the anti-torque assembly, and the lower end of the fork is thicker than the upper end of the fork.

11. An anti-torque assembly system for a helicopter, the system comprising:
a plurality of electrically driven, variable-speed motors mounted on one or more pivots on a tail boom of the helicopter, wherein each electrically driven, variable-speed motor drives a fixed blade pitch rotor;
one or more drive mechanisms that orient the electrically driven, variable-speed motors to direct a thrust anywhere between cancelling a torque of a rotor blade and towards a rear of the helicopter; and
wherein each electrically driven, variable-speed motor is independently controlled.

12. The system of claim 11, wherein the plurality of electrically driven, variable-speed motors can operate: in a different direction from the other motors to provide opposing thrust; with the thrust in the same direction; with different speeds; or with different directions and speeds.

13. The system of claim 11, wherein the plurality of electrically driven, variable-speed motors comprise 3, 4, 5, 6, 7, 8, 9, 10, 11, 12, 13, 14, 15, or more electrically driven, variable-speed motors, and each motor can be: turned on or off independently or as a group; or each motor can independently direct thrust in a different direction.

14. The system of claim 11, wherein the thrust adjusts at least one of a yaw, roll or pitch of the helicopter.

15. The system of claim 11, further comprising a ring or cowling that surrounds one or more of the individual electrically driven, variable-speed motors and rotors of the anti-torque assembly, each ring or cowling being attached to a separate pivot, or the anti-torque assembly is surrounded by a single ring or cowling that is attached to the pivot.

16. The system of claim 11, further comprising a logic in a flight control computer that calculates a direction and the thrust from the anti-torque assembly.

17. The system of claim 16, wherein the logic in the flight control computer independently controls fan direction and speeds for the electrically driven, variable-speed motors to position the anti-torque assembly for optimum thrust angle, as well as optimum thrust magnitude.

18. The system of claim 11, wherein the pivot is offset from the tail boom.

19. The system of claim 11, further comprising a fork attached to the tail boom, wherein the anti-torque assembly is mounted to the fork.

20. The system of claim 19, wherein the fork includes an upper end and a lower end configured to be attached to an upper pivot position and a lower pivot position, respectively, of the anti-torque assembly, and the lower end of the fork is thicker than the upper end of the fork.

21. A method of operating a helicopter, the method comprising:
orienting an anti-torque assembly to direct a thrust anywhere between cancelling a torque of a rotor blade and towards a rear of the helicopter, wherein the anti-torque assembly comprises a plurality of electrically driven, variable-speed motors on a pivot at an end of a tail boom of the helicopter, and each electrically driven, variable-speed motor drives a fixed blade pitch rotor helicopter; and
wherein each electrically driven, variable-speed motor is independently controlled.

22. The method of claim 21, further comprising operating the plurality of electrically driven, variable-speed motors in a different direction from the other motors to provide opposing thrust; with the thrust in the same direction; with different speeds; or with different directions and speeds.

23. The method claim 21, wherein the anti-torque assembly comprises 3, 4, 5, 6, 7, 8, 9, 10, 11, 12, 13, 14, 15, or more electrically driven, variable-speed motors, and each motor can be: turned on or off independently or as a group; or each motor can independently direct thrust in a different direction.

24. The method of claim 21, further comprising adjusting the orientation of the antitorque assembly to adjust at least one of a yaw, roll or pitch of the helicopter.

25. The method of claim 21, further comprising calculating a direction and the thrust from the anti-torque assembly using a logic in a flight control computer.

26. The method of claim 25, further comprising independently controlling fan direction and speeds for the electrically driven, variable-speed motors to position the anti-torque assembly for optimum thrust angle, as well as optimum thrust magnitude.

* * * * *